D. F. HOLMES.
SYRUP PITCHER.
APPLICATION FILED JULY 17, 1914.

1,149,445.

Patented Aug. 10, 1915.

Witnesses
C. F. Miller Jr.
E. R. Jacobson.

Inventor
Davis F. Holmes
By Geo. F. Kimmel.
Attorney

UNITED STATES PATENT OFFICE.

DAVIS F. HOLMES, OF NEW ORLEANS, LOUISIANA.

SYRUP-PITCHER.

1,149,445.  Specification of Letters Patent.  Patented Aug. 10, 1915.

Application filed July 17, 1914. Serial No. 851,492.

*To all whom it may concern:*

Be it known that I, DAVIS F. HOLMES, a citizen of the United States, residing at New Orleans, in the parish of Orleans and State of Louisiana, have invented certain new and useful Improvements in Syrup-Pitchers, of which the following is a specification.

This invention relates to kitchen and table articles and more specifically to syrup pitchers.

The object of my invention is to provide a syrup pitcher with a removable cover so that the same may be readily taken off for the purpose of washing the pitcher.

As at present constructed it is practically impossible to wash the inside of syrup pitchers. My invention overcomes this difficulty entirely by providing a cover which may be removed and replaced in a quick and simple manner. With a pitcher of this construction, so easily cleaned, its use for other purposes than as a container for syrup, would be adopted for sanitary reasons alone.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claim appended hereunto and forming a part of this application.

Figure 1:
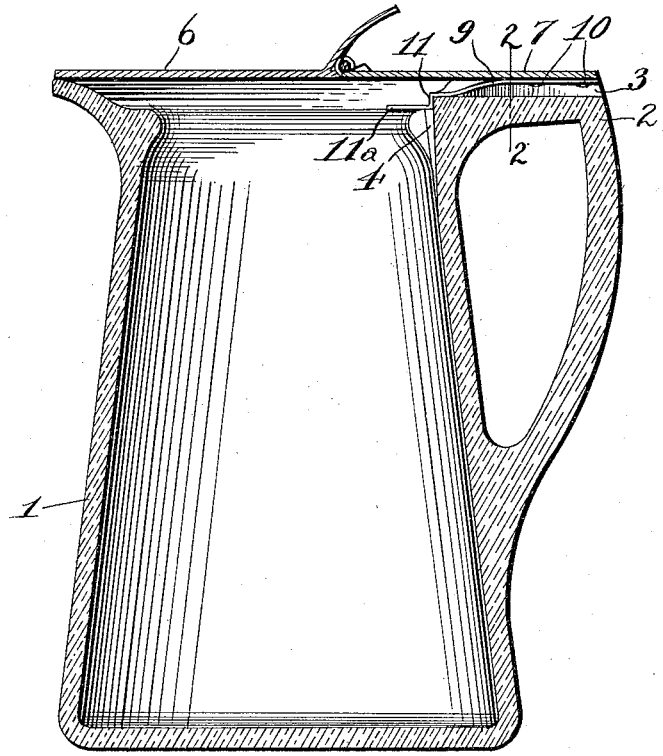
Figure 2:
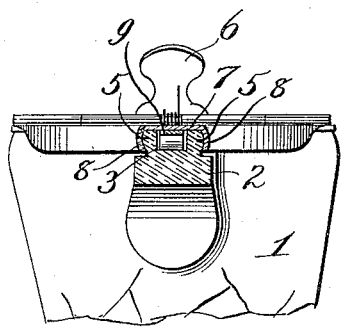

Referring now to the drawings which are merely illustrative of my invention, Figure 1 is a vertical sectional view of my removable cover in locked position upon a pitcher, while Fig. 2 is a cross-sectional view through the handle of the pitcher taken on the line 2—2 of Fig. 1.

Referring further to the drawings wherein similar reference characters indicate similar parts throughout the respective views, 1 designates a syrup pitcher of glass or any other suitable material, provided with a handle 2, whose upper portion extends rearwardly from the mouth of the pitcher and horizontally for a certain distance, with the top thereof on a plane with the top of the pitcher. The said handle 2 is provided longitudinally of the top thereof with a groove 3 centrally disposed and extending from the outer end of the handle to the inner circumference of the mouth of the pitcher, said groove thence extending downwardly to form a spring-abutment 4. The upwardly projecting lugs 5 thus formed along the top of the handle 2 are slightly convex along the outer edge thereof so that the cover hereinafter described may be held in engagement thereon. The cover member is provided with the usual spring operated lid portion 6, having a tongue piece 7 projecting rearwardly therefrom. Said tongue piece is of a length equal the length of the top of the handle 2, and is provided with flanges 8 extending along the length thereof downwardly and inwardly in a manner adapted to engage with upwardly projecting lugs 5. A leaf spring 9 is fixed at 10 to the under side of said tongue piece longitudinally of and centrally disposed with respect thereto. The free end of said spring extends inwardly and is adapted to press downwardly within the groove 3. Furthermore said spring is provided with an L-shaped offset 11 integral therewith from the point of contact with spring-abutment 4, thence inwardly toward the center of the pitcher. The inwardly extending arm 11$^a$ of the L-shaped offset 11 of the spring member is adapted to be pressed upwardly in order to disengage the spring from its abutment so that the tongue-piece may be slid rearwardly out of engagement with upwardly projecting lugs 5, thereby disengaging the cover. The spring automatically catches when the cover is pushed back into position.

The utility, adaptability, and advantages of my improved form of pitcher being obviously apparent, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claim.

What I claim as my invention and desire to protect by Letters Patent is:

In an article of the character described, in combination with a pitcher, upstanding flanges formed in parallelism upon the upper part of the handle of said pitcher, the top of said flanges being flush with the top of said pitcher, the outer face of said flanges being curved, a cover member adapted to seat upon the top of said pitcher, a tongue formed integral with said cover, flanges curved inwardly upon both sides of said tongue, said last named flanges adapted to engage with said upstanding flanges, a spring member centrally mounted at one end thereof upon the inner face of said tongue, and an L-shaped extension integral with the free end of said spring member adapted to engage with the inner face of said pitcher.

In testimony whereof I affix my signature in presence of two witnesses.

DAVIS F. HOLMES.

Witnesses:
E. D. BARBIERIS,
M. A. POWELL.

Copies of this patent may be obtained for five cents each, by addressing the "Commissioner of Patents, Washington, D. C."